United States Patent [19]

Sheth et al.

[11] Patent Number: 5,241,675
[45] Date of Patent: Aug. 31, 1993

[54] METHOD FOR ENFORCING THE SERIALIZATION OF GLOBAL MULTIDATABASE TRANSACTIONS THROUGH COMMITTING ONLY ON CONSISTENT SUBTRANSACTION SERIALIZATION BY THE LOCAL DATABASE MANAGERS

[75] Inventors: Amit P. Sheth, East Brunswick, N.J.; Dimitrios Georgakopoulos, Needham, Mass.; Marek E. Rusinkiewicz, Richmond, Tex.

[73] Assignee: Bell Communications Research, Inc., Livingston, N.J.

[21] Appl. No.: 865,995

[22] Filed: Apr. 9, 1992

[51] Int. Cl.$^5$ .................. G06F 15/40; G06F 15/16; G06F 13/10; G06F 15/18
[52] U.S. Cl. .................. 395/600; 395/650; 395/425; 364/DIG. 1; 364/282.1; 364/281.8; 364/281.3; 364/281.4; 364/281.5
[58] Field of Search .............. 364/900, 200, 300, 578; 395/425 MS File, 600 MS File, 650 MS File

[56] References Cited

U.S. PATENT DOCUMENTS

| | | | |
|---|---|---|---|
| 4,186,438 | 1/1980 | Benson et al. | 364/200 |
| 4,648,036 | 3/1987 | Gallant | 364/300 |
| 4,714,996 | 12/1987 | Gladney et al. | 364/300 |
| 4,821,220 | 4/1989 | Duisberg | 364/578 |
| 4,881,166 | 11/1989 | Thompson et al. | 395/600 |
| 4,912,637 | 3/1990 | Sheedy et al. | 364/300 |

OTHER PUBLICATIONS

"2PC Agent Method: Achieving Serializability in Presence of Failures in a Heterogeneous Multidatabase", Wolski-Veljalainen, 1990 IEEE, pp. 321-330.
"Concurrency Control Issues in Distributed Heterogeneous Database Management Systems", Gligor and Popescu-Zeletin, Distributed Data Sharing Systems, 1985, Elsevier Science Publishers B.V. pp. 34-46.
"Concurrency Control and Recovery for Global Procedures in Federated Database Systems", R. Alonso, H. Garcia-Molina, K. Salem, Data Engineering, IEEE, Sep. 1987, vol. 10, No. 3, pp. 5-11.
"Effects of Local Autonomy on Global Concurrency Control in Heterogeneous Distributed Database Systems", W. Du, A. K. Elmagarmid, Y. Leu, S. D. Ostermann, In proceedings of the second International Conference on Data and Knowledge Systems for Manufacturing and Engineering (DKSME), Oct. 1989.
"Superdatabases for Composition of Heterogeneous Databases", Carlton Pu, 1988 IEEE, pp. 548-554.
"On Serializability of Multidatabase Transactions Through Forced Local Conflicts", D. Georgakopoulos, M. Rusinkiewicz, A. Sheth, 1991 IEEE, pp. 314-323.

*Primary Examiner*—Paul V. Kulik
*Assistant Examiner*—Wayne Amsbury
*Attorney, Agent, or Firm*—Leonard Charles Suchyta; Joseph Giordano

[57] ABSTRACT

Our invention guarantees global serializability by preventing multidatabase transactions from being serialized in different ways at the participating local database systems (LDBS). In one embodiment tickets are used to inform the MDBS of the relative serialization order of the subtransactions of each global transactions at each LDBS. A ticket is a (logical) timestamp whose value is stored as a regular data item in each LDBS. Each substransaction of a global transaction is required to issue the take-a-ticket operations which consists of reading the value of the ticket (i.e., read ticket) and incrementing it (i.e., write (ticket+1)) through regular data manipulation operations. Only the subtransactions of global transactions take tickets. When different global transactions issue subtransactions at a local database, each subtransaction will include the take-a-ticket operations. Therefore, the ticket values associated with each global subtransaction at the MDBS reflect the local serialization order at each LDBS. The MDBS in accordance with our invention examines the ticket values to determine the local serialization order at the different LDBS's and only authorizes the transactions to commit if the serialization order of the global transactions is the same at each LDBS. In another embodiment, the LDBSs employ rigorous schedulers and the prepared-to-commit messages for each subtransaction are used by the MDBS to ensure global serializability.

7 Claims, 7 Drawing Sheets

(Prior Art)

METHOD FOR ENFORCING THE SERIALIZATION OF GLOBAL MULTIDATABASE TRANSACTIONS THROUGH COMMITTING ONLY ON CONSISTENT SUBTRANSACTION SERIALIZATION BY THE LOCAL DATABASE MANAGERS

FIELD OF THE INVENTION

The present invention relates to a method for serializability control for use in multidatabase transactions and, more particularly to a method for multidatabase transaction management that ensures serializability of global transactions without violating the autonomy of local databases.

BACKGROUND OF THE INVENTION

A Multidatabase System (MDBS) is a facility that supports global applications accessing data stored in multiple databases. It is assumed that the access to these databases is controlled by autonomous and (possibly) heterogeneous Local Database Systems (LDBSs). The MDBS architecture allows local transactions and global transactions to coexist. Local transactions are submitted directly to a single LDBS, while the multidatabase (global) transactions are channeled through the MDBS interface. The objectives of multidatabase transaction management are to avoid inconsistent retrievals and to preserve the global consistency in the presence of multidatabase updates. The concept used to evaluate whether a multidatabase transaction management function preserves global consistency is serializability. A concurrent execution of transactions is serializable if it produces the same output and has the same effect on the database as some serial execution of the same transactions. Furthermore, a global execution is serializable if there exists a total order which is compatible with all the local serialization orders of the global transactions at the participating local database systems. These objectives are more difficult to achieve in MDBSs than in homogeneous distributed database systems because, in addition to the problems caused by data distribution and replication that all distributed database systems have to solve, transaction management in MDBSs must also cope with heterogeneity and autonomy of the participating LDBSs.

In a multidatabase environment, the serializability of local schedules is, by itself, not sufficient to maintain the multidatabase consistency. To assure that global serializability is not violated, earlier proposals require the MDBS to validate local schedules or the concurrency of global transaction processing is severely restricted. However, the local serialization orders are neither reported by the local database systems, nor can they be determined by controlling the submission of the global subtransactions or by observing their execution order. To determine the serialization order of the global transactions at each LDBS, the MDBS must deal not only with direct conflicts that may exist between the subtransactions of multidatabase transactions but also with the indirect conflicts that may be caused by the local transactions. Since the MDBS has no information about the existence and behavior of the local transactions, it is difficult to determine if an execution of global and local transactions is globally serializable.

To illustrate this point consider FIG. 1 which illustrates two multidatabase transactions $G_1$ and $G_2$, and a local transaction $T_1$ in a prior art multiprocessor database system (MDBS) 21 having an MDBS processor 22 and multiple local database systems of which two, $LDBS_1$ and $LDBS_2$, are depicted. The two global transactions $G_1$ and $G_2$ are typically requested by one or more system users whereas the local transaction $T_1$ would typically be requested by a user of the local database. In this example global transaction $G_1$ is comprised of two subtransactions; one of the subtransactions writes $\beta$ to $LDBS_2$ and the other subtransaction reads $\alpha$ in $LDBS_1$. Global transaction $G_2$ is also comprised of two subtransactions; the first subtransaction writes $\alpha$ to $LDBS_1$ and the second reads $\delta$ from $LDBS_2$. Local transaction $T_1$ is comprised of two operations; a write of $\delta$ and a read of $\beta$ both in $LDBS_2$. In FIG. 1 the transaction $G_1$ writing data item $\beta$ is shown as a path to $\beta$ from $G_1$. The path to $G_1$ from $\alpha$ denotes that $G_1$ reads $\alpha$. This notation is used to depict read and write operations. In our example, the global transactions have subtransactions in both LDBSs. In $LDBS_1$ because $G_1$ reads $\alpha$ and $G_2$ writes it, $G_1$ and $G_2$ directly conflict and the serialization order of the transactions is $G_1 \rightarrow G_2$. In $LDBS_2$ because $G_1$ and $G_2$ access different data items there is no direct conflict between $G_1$ and $G_2$ in $LDBS_2$. However, since the local transaction $T_1$ reads $\beta$ and writes $\delta$, $G_1$ and $G_2$ conflict indirectly in $LDBS_2$. In this case, the serialization order of the transactions in $LDBS_2$ becomes $G_2 \rightarrow T_1 \rightarrow G_1$. Now the global conflict is apparent. In the second transaction $G_2$ proceeds $G_1$ whereas in the first transaction the reverse is true. In summary:

Transactions at $LDBS_1 = G_1$ reads $\alpha$, $G_2$ writes $\alpha$; Serialization order: $G_1 \rightarrow G_2$. Transactions at $LDBS_2 = T_1$ reads $\beta$, $G_1$ writes $\beta$, $G_2$ read $\delta$, $T_1$ writes $\delta$, Serialization order: $G_2 \rightarrow T_1 \rightarrow G_1$.

In a multidatabase environment the MDBS has control over the execution of global transactions and the operations they issue. Therefore, the MDBS can detect direct conflicts involving global transactions, such as the conflict between $G_1$ and $G_2$ at $LDBS_1$ in FIG. 1. However, the MDBS has no information about local transactions and the indirect conflicts they may cause. For example, since the MDBS has no information about the local transaction $T_1$, it cannot detect the indirect conflict between $G_1$ and $G_2$ at $LDBS_2$. Although both local schedules are serializable, the transactions are globally non-serializable, i.e. there is no global order involving $G_1$, $G_2$ and $T_1$ that is compatible with both local schedules.

In the early work in this area the problems caused by indirect conflicts were not fully recognized. In their early paper, Gligor and Popescu-Zeletin ("Concurrency control issues in distributed heterogeneous database management systems", in Distributed Data Sharing Systems, North-Holland, 1985), stated that a schedule of multidatabase transactions is correct if multidatabase transactions have the same relative serialization order at each LDBS where they (directly) conflict. Breitbart and Silberschatz (Proceedings of SIGMOD International Conference on Management Data, June 1988) have shown that the above correctness criterion is insufficient to guarantee global serializability in the presence of local transactions. They proved that the sufficient condition for the global consistency requires the multidatabase transactions to have the same relative serialization order in all sites where they execute. The problem then becomes how does the MDBS ensure that multidatabase transactions have the same relative serialization order at all local sites if the MDBS is not aware of all direct and indirect conflicts?

Several solutions have been proposed in the prior art to deal with this problem, however, most of them are not satisfactory. The main problem with the majority of the proposed solutions is that they do not provide a way of assuring that the serialization order for the global transactions is the same as that in all the local serialization orders without violating the autonomy of the local databases.

Alonso, Garcia-Molina, and Salem in "Concurrency control and recovery for global procedures in federated database system", Quarterly Bulletin of the IEEE Computer Society technical committee in Data Engineering, September 1987, propose the use of site locking in the altruistic locking protocol to prevent undesirable conflicts between multidatabase transactions. Given a pair of multidatabase transactions $G_1$ and $G_2$, the simplest altruistic locking protocol allows the concurrent execution of $G_1$ and $G_2$ if they access different LDBSs. If there is a LDBS that both $G_1$ and $G_2$ need to access, $G_2$ cannot access it before $G_1$ had finished its execution there. However, Du, Elmagarmid, Leu and Osterman in "Effects of autonomy on maintaining global serializability in heterogeneous distributed database systems", Proceedings of the Second International Conference on Data Knowledge Systems for Manufacturing and Engineering, October, 1989, show that global serializability may be violated even when multidatabase transactions are submitted serially to their corresponding LDBSs. The scenario in FIG. 1 illustrates this problem. $G_1$ is submitted to both sites, executed completely and committed. Only then is $G_2$ submitted for execution; nevertheless the global consistency may be violated.

Another solution is proposed by Wolski and Veijalainen, "2PC Agent method: Achieving serializability in presence of failures in a heterogeneous multidatabase", Proceedings of PARBASE-90 Conference, February 1990. They propose that if all the LDBSs use two phase locking (2PL), a strict scheduling algorithm, the strict LDBSs will not permit local executions that violate global serializability. However, even local strictness is not sufficient. To illustrate the problem consider again the transactions in FIG. 1 with the following local schedules: in $LDBS_1$, $G_1$ reads $\alpha$, commits $G_1$, $G_2$ writes $\alpha$, and commits $G_2$; in $LDBS_2$, $G_1$ obtains a read lock on $\beta$, $G_1$ reads $\beta$, $G_2$ obtains a read lock on $\beta$, reads $\beta$, then releases the read lock on $\beta$ and doesn't obtain any more locks, $G_1$ obtains a write lock on $\beta$, writes $\beta$, then $G_1$ releases all its locks, $G_1$ commits, and then $G_2$ commits. The serialization order in $LDBS_1$ is $G_1 \rightarrow G_2$, whereas in $LDBS_2$ the serialization order is $G_2 \rightarrow G_1$. Both schedules are strict and are allowed by 2PL, but the global serializability is violated.

U.S. Pat. No. 4,881,166 (Thompson and Breitbart, "Method for Consistent Multidatabase Transaction Processing") proposes detecting for conflicts using site cycles. If there is a conflict found involving read operations at a site, a search for a new site is conducted. If a conflict is found involving the write operations then the transaction is aborted. In this patent, the MDBS using site graphs has no way of determining when it is safe to remove the edges of committed global transactions. The method may work correctly if the removal of the edges corresponding to committed transactions is delayed, however, then concurrency would be sacrificed.

C. Pu "Superdatabases for composition of heterogeneous databases", IEEE Proceedings of the 4th International Conference on Data Engineering, 1988, demonstrates global serializability can be assured if the LDBSs present the local serialization orders to the MDBS. Therefore, since traditional database management systems do not provide their serialization order, Pu proposes modifying the LDBSs to present the local serialization orders to the MDBS. However, this solution violates the local autonomy of the LDBSs.

It is therefore, the objective of our invention to enforce global serializability of transactions in a multidatabase system without violating the autonomy of the local databases.

SUMMARY OF THE INVENTION

The main difficulty in enforcing global serializability in a multidatabase environment lies in resolving indirect (transitive) conflicts between multidatabase transactions. Indirect conflicts introduced by local transactions are difficult to resolve because the behavior or even the existence of local transactions is not known to the multidatabase system. To overcome this problem, our invention incorporates additional data manipulation operations in the subtransactions of each global transaction. These operations create direct conflicts between subtransactions at each participating local database system allowing the resolution of indirect conflicts even though the multidatabase system is not aware of the method that the local database systems use to ensure local serializability. Our invention guarantees global serializability by preventing multidatabase transactions from being serialized in different ways at the participating database systems.

In accordance with one aspect of our invention, tickets are used to inform the MDBS of the relative serialization order of the subtransactions of each global transactions at each LDBS. A ticket is a (logical) timestamp whose value is stored as a regular data item in each LDBS. Each subtransaction of a global transaction is required to issue the take-a-ticket operations which consist of reading the value of the ticket (i.e., read ticket) and incrementing it (i.e., write (ticket+1)) through regular data manipulation operations. Only the subtransactions of global transactions take tickets. When different global transactions issue subtransactions at a local database, each subtransaction will include the take-a-ticket operations. If the order in which these subtransaction of the global transactions take their tickets at a local site is the same as their serialization order, the local concurrency controller will naturally allow the transactions to proceed. The local transaction manager or concurrency controller would, as a natural consequence of its normal function, assure that the ticket values acquired by the MDBS reflect the local serialization order of the subtransactions. Therefore, the ticket values associated with each global subtransaction at the MDBS reflect the local serialization at each LDBS. The MDBS in accordance with our invention then examines the ticket values to determine the local serialization order at the different LDBS's and then only authorizes the global transactions to commit if the serialization order of the global transactions is the same at each LDBS. If the local serialization orders are different, then the MDBS concurrency controller, in accordance with our invention, would restart or abort one of the global transactions to affect a new local serialization order that would ensure global serializability.

An alternative embodiment of our invention is the special situation where the local databases systems employ rigorous schedulers. Under a rigorous scheduler, no transaction can read or write a data item until all transactions that previously read or wrote the data item commit or abort. In this type of multidatabase system our inventive process depends on the prepared to commit notifications to the MDBS from the LDBSs to ensure global serializability. Initially, the MDBS sets timers for each global transaction and submits the subtransactions to the appropriate local databases. If all the subtransactions of one global transaction notify the MDBS that they are prepared to commit before all the subtransactions of another global transaction, the MDBS, in accordance with our invention, commits each subtransaction of this first global transaction before it commits any subtransaction of the other global transaction. If this condition is not satisfied, the MDBS will abort and restart any global transaction in which the MDBS hasn't received prepared to commit notifications before the global transactions' corresponding timer expired.

DETAILED DESCRIPTION

Our invention provides a concurrency control method for enforcing global serializability in a multidatabase environment. A typical multidatabase system includes a MDBS with a transaction manager and agents that control communication with a plurality of local databases.

Figure 2:
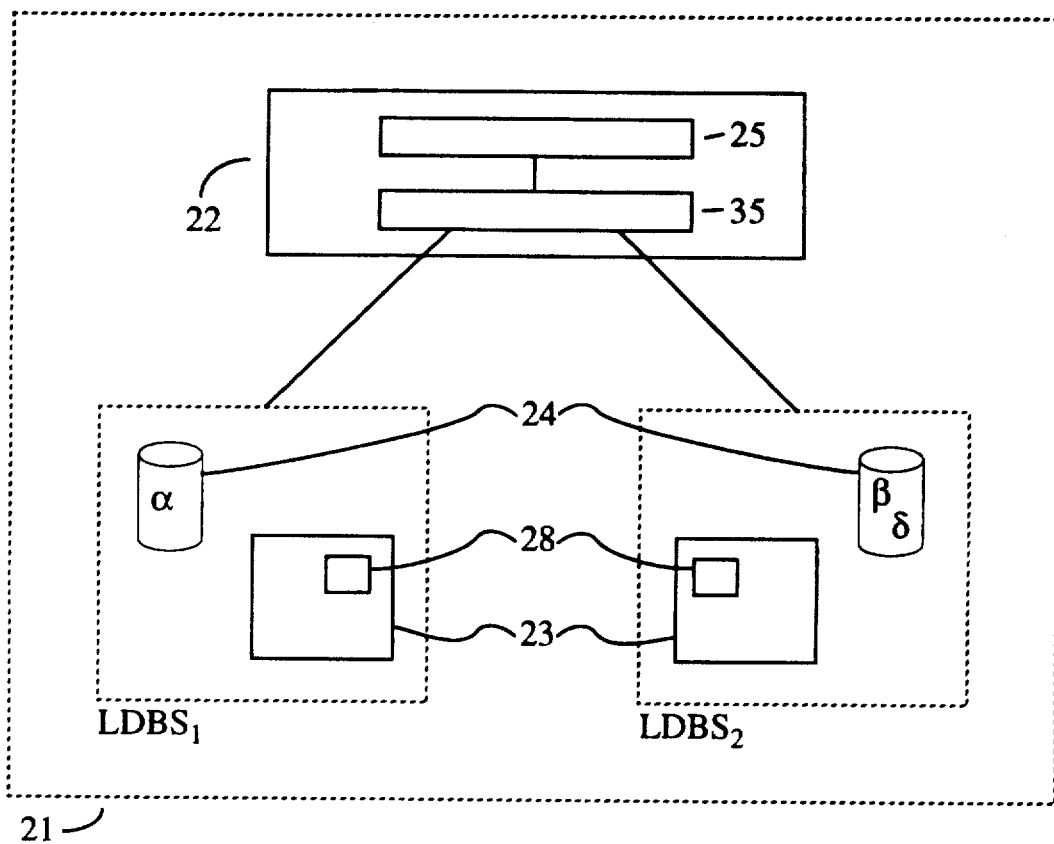
FIG. 2 depicts a typical prior art multidatabase system.

A typical prior art MDBS is depicted in FIG. 2. A MDBS 21 is composed of a MDBS processor 22 and a plurality of local database systems (LDBS) shown as $LDBS_1$ and $LDBS_2$. Each of these LDBSs are composed of a LDBS processor 23 including a local transaction management process 28 and a local data store 24. Each LDBS can employ its own different database management software. In addition, these LDBSs can be remotely located. The MDBS processor 22 contains a transaction manager process 25 that controls and manages the execution of the global transactions including dividing the global transactions into their corresponding subtransactions. The MDBS processor 22 also contains a communication management process 35 that controls the communication with the LDBSs over communication links 26 and 27 to issue subtransaction requests to each LDBS. From the users perspective the MDBS contains a global database, when, in actuality, the global database is a set of data items stored in the LDBS's local data stores 24. When the users request a transaction from the MDBS, the MDBS transaction manager 25 reduces the user's global transactions into constituent subtransactions, and requests execution of the subtransactions at each of the LDBSs over communication links 26 and 27. Each LDBS processor 23 recalls the appropriate data item from data store 24, invokes the local transaction management process 28 that schedules all local transactions, and executes the subtransaction in the local processor 23 according to the appropriate schedule developed in the local transaction management process 28. Once the subtransactions are completed in processor 23 and the local processor 23 is prepared to commit the subtransactions (i.e. record the effect of the execution of the subtransaction in the data store 24), it reports to the MDBS processor 22 that the local processor 23 is prepared to commit the completed subtransactions and then waits. If the MDBS transaction management process 25 determines that the execution of the transactions is serializable it instructs the LDBS transaction management process 28 to commit the corresponding subtransactions.

Figure 3:
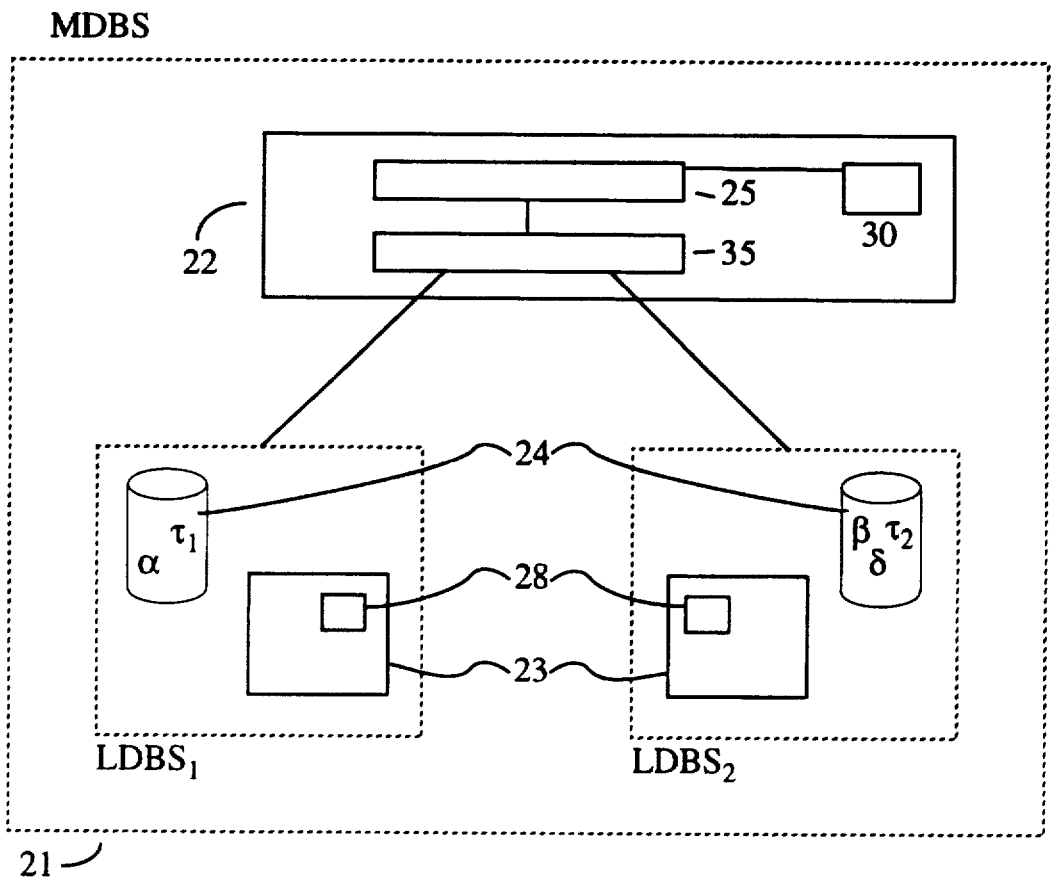
FIG. 3 depicts an illustrative embodiment of our inventive system.

A first embodiment of our invention is depicted in FIG. 3. Our invention adds a take-a-ticket process 30 to the MDBS processor 22 and ticket data items ($\tau_1$ and $\tau_2$) to the stores 24 of the LDBSs. The ticket data items can be created by the take-a-ticket process as an additional operation or they can be created as an inherent part of the LDBSs. Those skilled in the art could envision any number of ways to create the ticket data items. It is only important to our inventive method that they be created and available to the take-a-ticket process. A ticket is nothing more that a data item in the LDBS data store that can be used by our inventive process to reflect the order of subtransactions. The take-a-ticket process 30 appends to each global subtransaction request the take-a-ticket operations (i.e. read the ticket, increment the ticket, and write the incremented ticket value).

Figure 1:
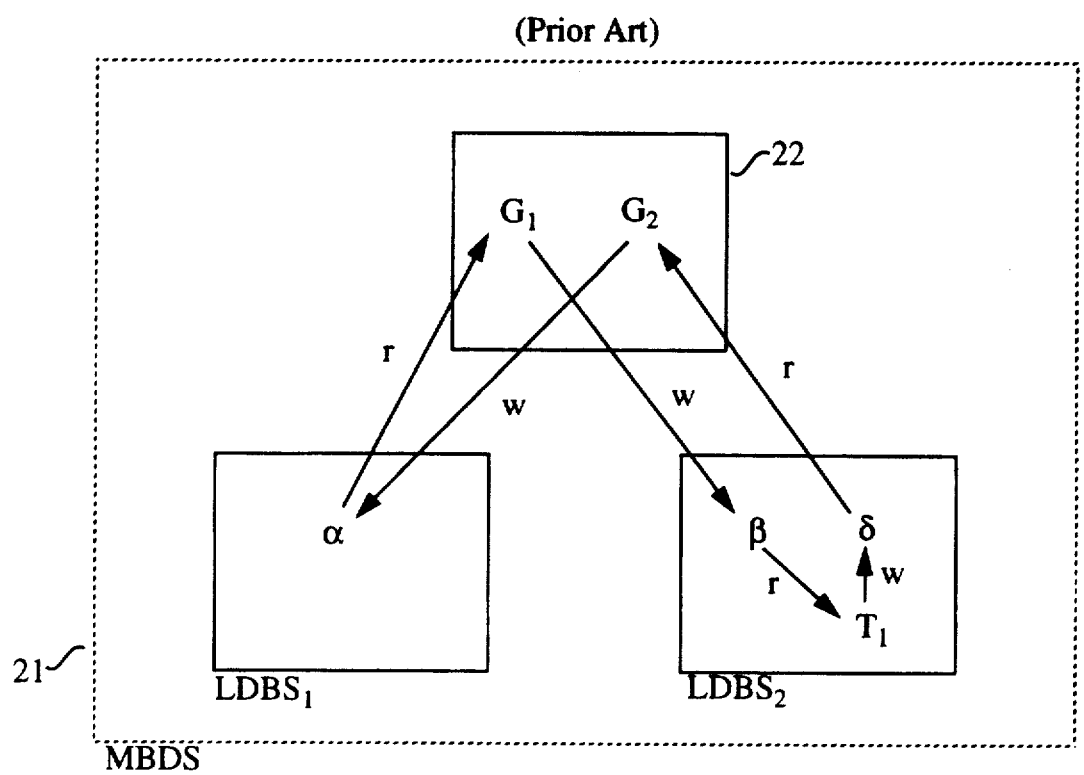
FIG. 1 is a graphical representation of a typical prior art serialization problem in a multidatabase system.
Figure 4:
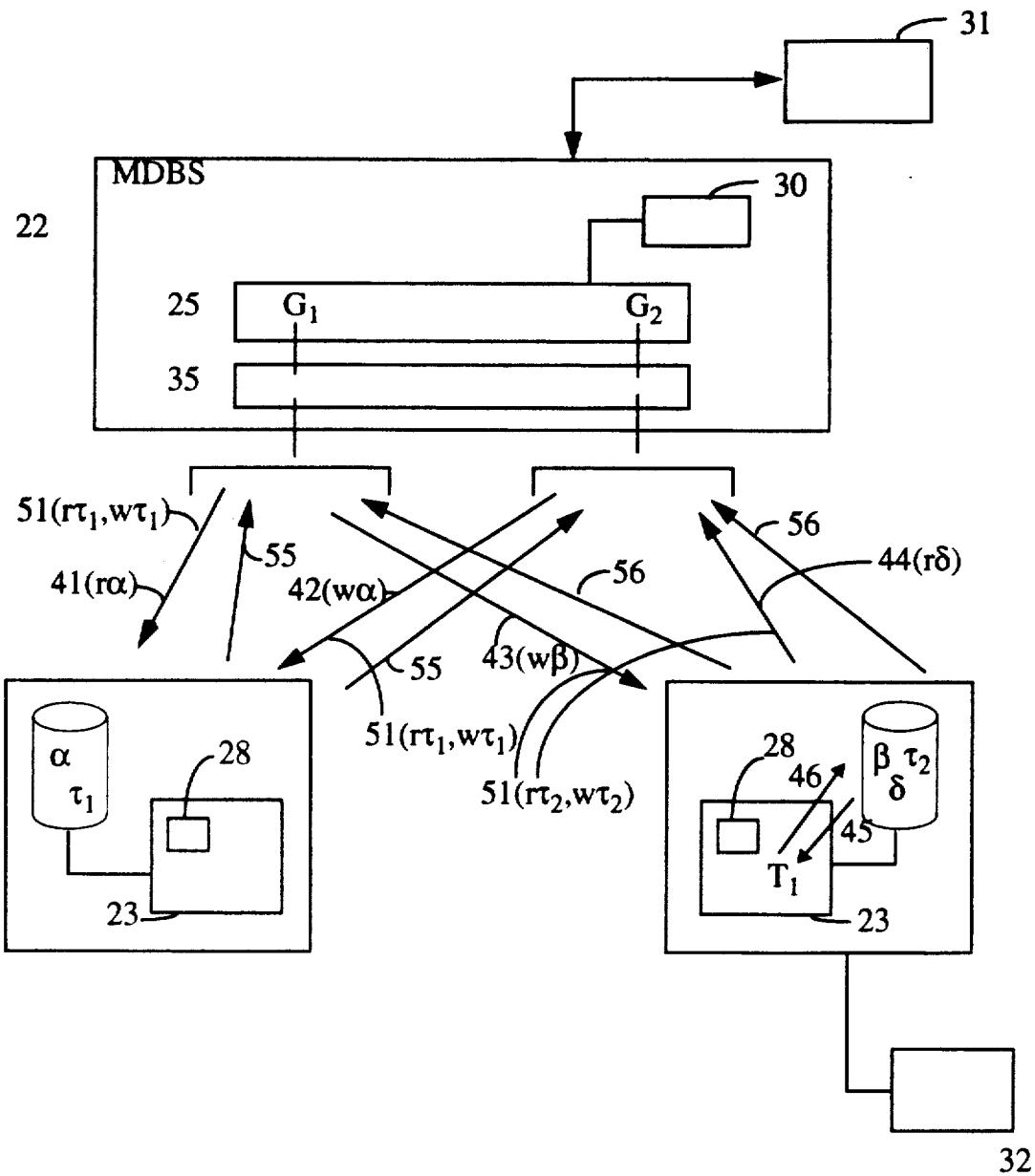
FIG. 4 depicts an exemplary operation of our inventive method as it relates to the problem depicted in FIG. 1.

FIG. 4 depicts the operation of our inventive process as it relates to the problem illustrated in FIG. 1. The two global transactions $G_1$ and $G_2$ are requested by one or more system users 31 at the MDBS system processor 22. The transaction management process 25 determines the subtransactions required to complete each global transaction and which local data items from any one of the plurality of LDBSs are necessary for processing. The take-a-ticket process 30 appends to each subtransaction the take-a-ticket operations 51 (i.e. read the value of a ticket $\tau_i$, an increment the value of $\tau_i$ by 1 operation, and a write the incremented value of $\tau_i$). The communications process 35 issues the subtransaction requests with the appended take-a-ticket operations to the appropriate LDBS. In our example illustrated in FIG. 3, Global transaction $G_1$ is composed of two subtransactions; a read operation $\alpha$ 41 in $LDBS_1$ and a write $\beta$ operation 43 to $LDBS_2$. Global transaction $G_2$ is also composed of two subtransactions; a write $\alpha$ operation 42 to $LDBS_1$ and a read $\delta$ operation 44 from $LDBS_2$. Local transaction $T_1$ is an $LDBS_2$ transaction requested by a local user 32 and is composed of two operations; a write of $\delta$ 46 and a read of $\beta$ 45. The ticketing operations 51 read $\tau_1$ ($r\tau_1$), and write $\tau_1$ ($w\tau_1$) are depicted in FIG. 4 in the same path as the read $\alpha$ ($w\alpha$) operation 41 $G_1$ and the write $\alpha$ ($r\alpha$) operation 42 for global transaction $G_2$.

Local transaction $T_1$ wouldn't require a ticket because it is a local transaction contained solely within $LDBS_2$ and therefore under the control of the local transaction management process 28 within the LDBS processor 23. The local transaction management process 28 ensures local serialization of the subtransactions of $G_1$ and $G_2$ in each LDBS. The ticket operations create a direct conflict between the global transactions at each database. This means that the global transactions can be locally serialized according to the order of the take-a-ticket operations. If there are other operations issued by global transactions that conflict and their execution order is different than the local order in which the global transactions take their tickets, then the LDBS transaction management process 28 would abort and restart one the transactions to maintain serializability.

For each subtransaction at each local database, the local database processor 23 retrieves the needed data items from the data store 24. The subtransactions are completed on each data item in the processor 23 but not yet written to the data store 24. Once all the subtransactions are complete and properly serialized by the local transaction manager, prepared to commit messages 55 and 56 are sent to the MDBS processor 22. The MDBS transaction management process 25 then examines the ticket values associated with each subtransaction to determine the local serialization order in each LDBS. If the local serialization orders are different in the two local databases, the MDBS would restart or abort one of the global transactions in order to achieve serializability of all transactions. If the local serialization orders were the same, the MDBS transaction management process 25 would instruct the LDBS to commit the subtransactions.

Our inventive method can process any number of multidatabase transactions concurrently, even if they conflict at multiple LDBSs. However, since our inventive method forces the subtransactions of multidatabase transactions to directly conflict on the ticket, it may cause some subtransactions to get aborted or blocked because of these conflicts. It is an additional aspect of our invention to use the capability of the system to take tickets at any time during the processing of the subtransactions to optimize the point at which ticketing commences. The optimization is based on the number, time and type of the data manipulation operations issued. For example, if all global transactions conflict directly at some LDBS, there is no need for them to take tickets. To determine their relative serialization order there, it is sufficient to observe the order in which they issue their conflicting operations.

Figure 5A:
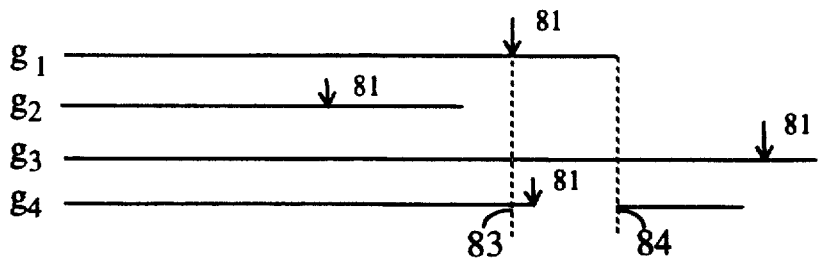
FIGS. 5a, 5b and 5c illustrate various choices for timing ticketing operations to resolve conflicts.

The appropriate choice of the point in time to take the ticket during the lifetime of a subtransaction can minimize the synchronization conflicts among subtransactions. For instance, if a LDBS uses two phase locking (2PL), it is more appropriate to take the ticket immediately before a subtransaction enters its prepared to commit state. To show the effect of this convention FIG. 5a illustrates the impact of 2PL on the ticketing operations. The arrows 81 indicate the beginning of the ticketing operations. The end of the lines indicate when each subtransaction commits. Two phase locking requires that each subtransaction sets a write lock on the ticket $\tau$ before it increments its value. Given four concurrent subtransactions $g_1$, $g_2$, $g_3$ and $g_4$, $g_1$ does not interfere with $g_2$ which can take its ticket and commit before $g_1$ takes its ticket. Similarly, $g_1$ does not interfere with $g_3$, so $g_1$ can take its ticket and commit before $g_3$ takes its ticket. However, when $g_4$ attempts to take its ticket after $g_1$ has taken its ticket but before $g_1$ commits and releases its ticket lock, it gets blocked until $g_1$ is committed. The dotted lines 83 and 84 illustrate where $g_1$ conflicts and blocks $g_4$. The ticket values always reflect the serialization order of the subtransactions of multidatabase transactions but the ticket conflicts are minimized if the time when $g_1$ takes its ticket is as close as possible to its commitment time.

Figure 5B:
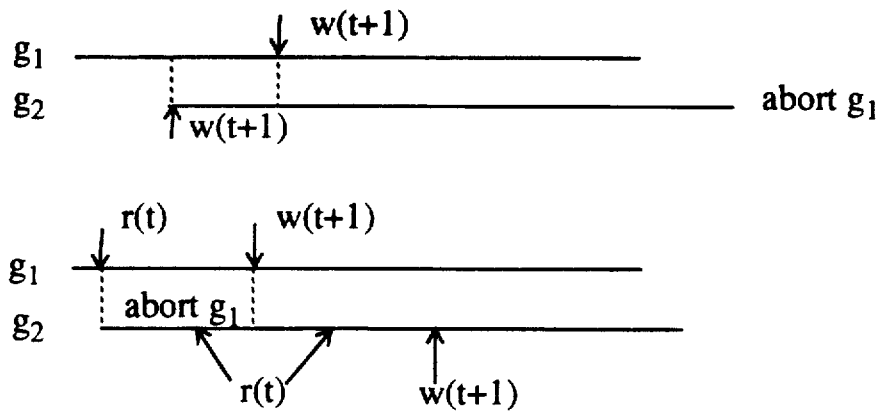

If a LDBS uses timestamp ordering (TO) illustrated in FIG. 5b, it is better to obtain the ticket when the subtransaction begins its execution. More specifically, TO assigns a a timestamp ts($g_1$) to a subtransaction $g_1$ when it begins its execution. Let $g_2$ be another subtransaction such that ts($g_1$)<ts($g_2$). If the ticket obtained by $g_1$ has a larger value than the ticket of $g_2$, then $g_1$ is aborted. Clearly, if $g_2$ increments the ticket value before $g_1$ then, since $g_2$ is younger than $g_1$, either read $g_1$ (ticket) or write $g_1$ (ticket) conflicts with the write $g_2$ (ticket) and $g_1$ is aborted. Hence, only $g_1$ is allowed to increment the ticket value before $g_2$. Similarly, if $g_2$ reads the ticket before $g_1$ increments it, then when $g_1$ issues write $g_1$ (ticket) it conflicts with the read $g_2$ (ticket) operation issued before and $g_1$ is aborted. Therefore, given that ts($g_1$)<ts($T_2$), either $g_1$ takes its ticket before $g_2$ or it is aborted. Therefore, its is better for subtransactions to take their tickets as close as possible to the point they are assigned their timestamps under TO, i.e., at the beginning of their execution.

Figure 5C:
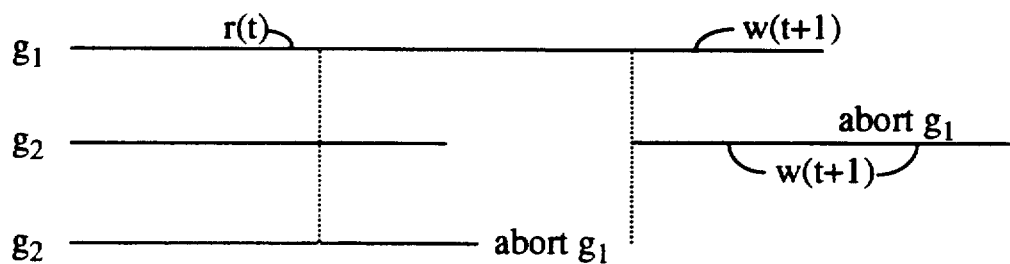

Finally, if a LDBS uses an optimistic protocol which uses transaction readsets and writesets to validate transactions, there is no best time for the subtransactions to obtain their tickets illustrated in FIG. 5c. Each subtransaction $g_1$ reads the ticket value before it starts its (serial or parallel) validation but increments it at the end of its write phase. If another transaction $g_2$ is able to increment the ticket in the meantime, $g_1$ is restarted.

The take-a-ticket process described above is a mechanism for accurately communicating the local serialization order of the global transactions to the MDBS without modifying the LDBSs. However, in order to simplify transaction processing, we have discovered that employing rigorous scheduling algorithms in an LDBS guarantees that the local serializations orders for subtransactions are reflected in the order the MDBS receives the ready to commit messages. Under a rigorous scheduler, no transaction can read or write a data item until all transactions that previously read or wrote it, commit or abort. That is, the notion of rigorousness effectively eliminates conflicts between uncommitted transactions. The class of rigorous transaction management algorithms includes several common transaction mechanisms, such as, conservative TO, the optimistic protocol with serial validation, and the strict two-phase locking (2PL) protocol, a variant of 2PL, under which a transaction must hold its read and write locks until it terminates.

Figure 6:
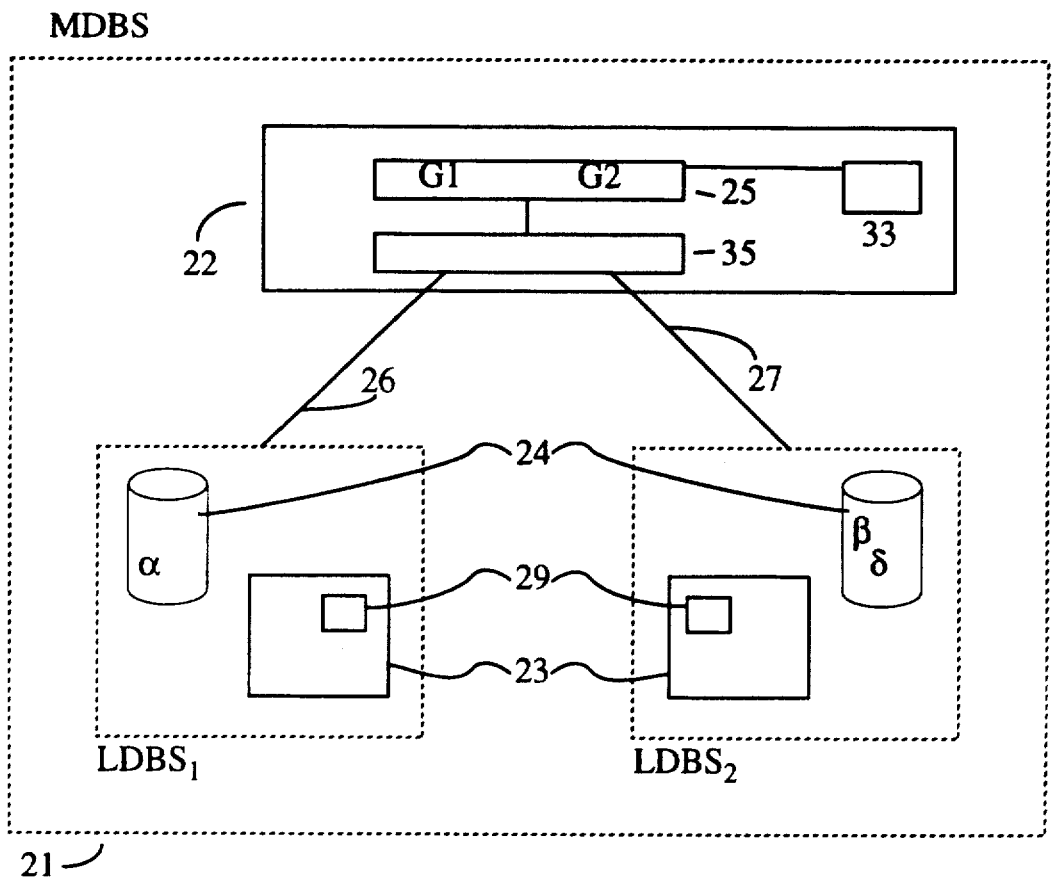
FIG. 6 illustrates an alternative embodiment of our invention using implicit tickets.

To take advantage of rigorous LDBSs, an alternative embodiment of our invention is illustrated in FIG. 6 in which all LDBSs employ a rigorous transaction management process 29. This embodiment ensures global serializability by preventing the subtransactions of each multidatabase transaction from being serialized in different ways at their corresponding LDBSs. Unlike the previous embodiment there is not a need to maintain tickets, and therefore, the subtransactions of global transactions do not need to explicitly take and increment tickets. In this alternative embodiment, the MDBS processor can ensure the serialization order of the subtransactions executed in the LDBS by committing all the subtransactions of one global transaction before all the subtransactions of another global transaction provided the MDBS received all the prepared to commit notifications of one before the other. To achieve global serializability, the commitment (execution) order and thus the serialization order of multidatabase subtransactions is controlled as follows. Let $G_1$ and $G_2$ be two multidatabase transactions. Assuming rigorous LDBSs, the MDBS transaction management process 25 employs an implicit ticketing process (ITP) 33 which guarantees that in all participating LDBSs either the subtransactions of $G_1$ are committed before all subtransactions of $G_2$, or the subtransactions of $G_2$ are committed prior to the subtransactions of $G_1$.

ITP process 33 achieves this objective as follows. Initially, the MDBS sets timers for $G_1$ and $G_2$ and submits their subtransactions to the corresponding LDBSs. All subtransactions are allowed to interleave under the control of the LDBSs until they enter their prepared to commit state. If all subtransactions of $G_1$ report prepared to commit to the ITP before all subtransactions of $G_2$, report prepared to commit, ITP commits each subtransaction of $G_1$ before any subtransaction of $G_2$. If all subtransactions of $G_2$ are prepared to commit first, each subtransaction of $G_2$ is committed before any subtransaction of $G_1$. If neither of these happens, the MDBSs aborts and restarts any multidatabase transaction that has subtransactions which did not report their prepared to commit state before the timer expired. Given two multidatabase transactions $G_1$ and $G_2$, ITP process 33 commits each subtransaction of $G_1$ before the corresponding subtransaction of $G_2$ or vice versa. Therefore, all subtractions of each multidatabase transaction are serialized the same way in their corresponding LDBSs.

Figure 7:
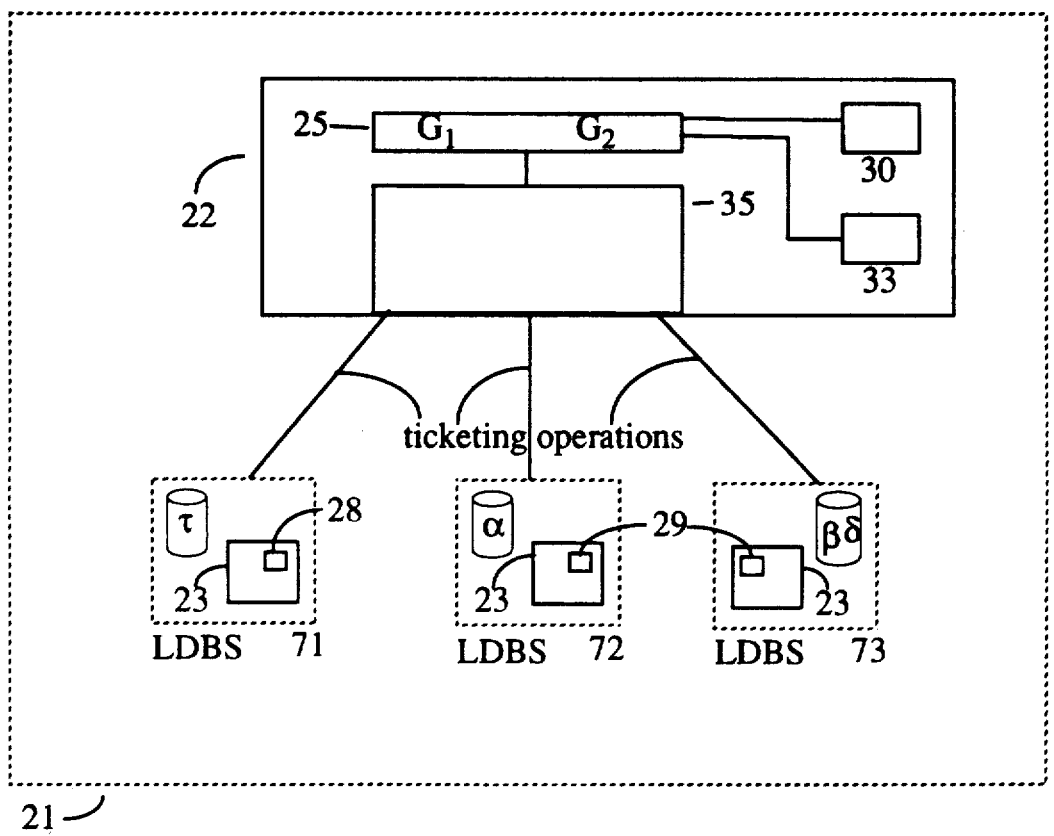
FIG. 7 illustrates a third alternative embodiment of our invention that combines the first two embodiments.

A third alternative embodiment of our invention is illustrated in FIG. 7 and is a combination of the two previous embodiments. It consists of a MDBS 21 with a MDBS processor 22 having both the take-a-ticket process 30 and the implicit ticketing process 33 contained within the MDBS transaction management process 25. Amongst the plurality of LDBSs, some LDBSs 72 and 73 employ rigorous schedulers 29 while LDBS 71 has ticket data items 74. The MDBS transaction manager invokes the take-a-ticket process 30 whenever subtransactions are issued to LDBSs without rigorous schedulers, such as LDBS 71, while the MDBS transaction manager 25 invokes the implicit ticket process 33 whenever subtransactions are issued to LDBSs with rigorous schedulers, such as LDBS 72 and 73. The MDBS transaction manager 25 conducts its serializability analysis on the global transactions using the ticket values for those subtransaction with tickets to determine their local serialization order and use the subtransaction commitment order for those subtransactions executed at LDBSs employing a rigorous scheduler process 29.

Clearly, those skilled in the art recognize that the principles that define our method are not limited to the embodiment illustrated herein. Other embodiments may be readily devised by those skilled in the art.

What is claimed is:

1. A method for ensuring global serialization of global transactions in a multidatabase system having a transaction management process and a plurality of local database systems with their own local transaction management processes, with said global transactions having subtransactions requiring execution in said local database systems, said method comprising:

appending, by said multidatabase transaction management process, take-a-ticket operations to each subtransaction of a global transaction to be executed in any one of said local database systems;

executing said take-a-ticket operations in said one local database system, by said local transaction management process to obtain ticket values for said subtransactions, and communicating said ticket values back to said multidatabase transaction management process;

serializing, but not commiting, said subtransactions in said local database systems with the local transactions in said local database systems according to local procedures employed in the local transaction management process of said local database systems; and examining said ticket values by said multidatabase transaction management process and authorizing the global transactions to commit only when the serialization order of the subtransactions of the said global transactions as reflected by the ticket values is the same in all instances, by issuing commitment orders for all the subtransactions of the global transactions to said local transaction management processes.

2. The method as recited in claim 1 wherein said executing step comprises the steps of:

reading a ticket data item from said one local database system and communicating its value back to said multidatabase system transaction management process;

incrementing the value of said ticket data item; and writing the value of said incremented ticket data item in said one local database system.

3. The method as recited in claim 2 wherein said examining step further comprises:

aborting one of said global transactions if the serialization of said subtransactions is not the same in each of said local database systems.

4. The method as recited in claim 2 wherein said examining step further comprises:

restarting one of said global transactions if the serialization of said subtransactions is not the same in each of said local database systems.

5. A method as recited in claim 1 wherein said executing step commences just prior to said subtransaction commitment time whenever said one local database system uses two phase locking transaction management.

6. A method as recited in claim 1 wherein said executing step commences before said subtransaction execution whenever said one local database system employs time stamp ordering transaction management.

7. A method for ensuring global serialization of global transactions in a multidatabase system having a transaction management process and plurality of local database systems each having its own data store and with their own transaction management processes, with said global transactions having subtransactions requiring execution in said local database systems, said method comprising:

initiating a timer for each of said global transactions having subtransactions for execution in said local database systems;

issuing requests for said subtransactions to said local database systems;

scheduling said subtransaction requests in said local database systems according to a rigorous scheduling algorithm;

executing said subtransaction requests in said local database systems without updating the results of said executed subtransactions in said local database systems data stores;

notifying said multidatabase system when each of said subtransaction requests completes execution but has not yet recorded the results in its local database system data store;

examining said notifications received at said multidatabase system from said local database systems to determine which global transaction has first received notification from all of its subtransactions;

aborting and restarting any one of said global transactions whenever said one global transaction doesn't receive said notification for all its subtransactions before said timer expires; and issuing commitment orders for all subtransactions of a global transaction which first receives said notification of completion from all of its subtransactions.

* * * * *